(12) United States Patent
George

(10) Patent No.: US 8,467,905 B2
(45) Date of Patent: *Jun. 18, 2013

(54) ENVIRONMENT CONTROL SYSTEM

(75) Inventor: Josmon C. George, Fortville, IN (US)

(73) Assignee: Josmon C. George, Fortville, IN (US)

(*) Notice: Subject to any disclaimer, the term of this patent is extended or adjusted under 35 U.S.C. 154(b) by 210 days.

This patent is subject to a terminal disclaimer.

(21) Appl. No.: 12/796,426

(22) Filed: Jun. 8, 2010

(65) Prior Publication Data
US 2010/0312397 A1 Dec. 9, 2010

Related U.S. Application Data

(63) Continuation-in-part of application No. 12/780,049, filed on May 14, 2010.

(60) Provisional application No. 61/268,132, filed on Jun. 8, 2009.

(51) Int. Cl.
G05D 23/19 (2006.01)

(52) U.S. Cl.
USPC ............ 700/276; 700/278; 236/44 C

(58) Field of Classification Search
USPC ........ 700/276, 277, 278, 299, 300; 236/91 R, 236/91 C, 91 D, 91 E, 91 F
See application file for complete search history.

(56) References Cited

U.S. PATENT DOCUMENTS

| | | | |
|---|---|---|---|
| 4,537,035 A * | 8/1985 | Stiles | ........................... 236/49.1 |
| 5,076,346 A | 12/1991 | Otsuka | |
| 5,395,042 A | 3/1995 | Riley et al. | |
| 5,850,968 A * | 12/1998 | Jokinen | ........................ 236/44 C |
| 5,984,002 A * | 11/1999 | Kido et al. | ................... 236/44 C |
| 6,071,189 A | 6/2000 | Blalock | |
| 6,079,483 A * | 6/2000 | Morooka et al. | ............ 236/44 C |
| 6,098,893 A | 8/2000 | Berglund et al. | |
| 6,405,543 B2 | 6/2002 | Kopko | |
| 6,431,268 B1 | 8/2002 | Rudd | |
| 6,481,232 B2 * | 11/2002 | Faqih | .............................. 62/291 |
| 6,591,620 B2 * | 7/2003 | Kikuchi et al. | ................ 700/276 |
| 6,749,125 B1 | 6/2004 | Carson et al. | |
| 6,958,010 B1 * | 10/2005 | Reese | ........................... 454/239 |
| 7,004,401 B2 * | 2/2006 | Kallestad | ..................... 236/91 C |

(Continued)

FOREIGN PATENT DOCUMENTS

| | | |
|---|---|---|
| KR | 10-0799372 B1 | 1/2008 |
| KR | 10-0893835 B1 | 4/2009 |

OTHER PUBLICATIONS

International Search Report and Written Opinion issued by the Korean Intellectual Property Office, dated Jan. 25, 2011, for International Application No. PCT/US2010/037778; 6 pages.

(Continued)

Primary Examiner — Charles Kasenge
(74) Attorney, Agent, or Firm — Faegre Baker Daniels LLP

(57) ABSTRACT

A control system for governing temperature and humidity levels within a confined space including a controller communicatively coupled to a cooling system, a heating system, a duct system, a plurality of environmental sensors for detecting temperature and humidity levels within the confined space and external to the confined space, and an external air intake for introducing air external to the confined space to within the confined space. The control system may further include predictive heating and predictive cooling configurations having a computing device communicatively connected to the controller and to an environmental forecast source.

20 Claims, 7 Drawing Sheets

U.S. PATENT DOCUMENTS

| | | | |
|---|---|---|---|
| 7,024,283 B2 * | 4/2006 | Bicknell | 700/276 |
| 7,218,996 B1 * | 5/2007 | Beitelmal et al. | 700/276 |
| 7,225,171 B2 * | 5/2007 | Kikuchi et al. | 700/276 |
| 7,266,960 B2 * | 9/2007 | Shah | 236/44 C |
| 7,398,821 B2 * | 7/2008 | Rainer et al. | 165/247 |
| 7,740,184 B2 * | 6/2010 | Schnell et al. | 236/44 C |
| 7,827,813 B2 * | 11/2010 | Seem | 236/44 C |
| 7,836,712 B2 * | 11/2010 | Sasao et al. | 62/176.6 |
| 7,958,229 B2 * | 6/2011 | Conway | 709/224 |
| 7,958,740 B2 * | 6/2011 | Hirai et al. | 236/44 R |
| 7,987,680 B2 * | 8/2011 | Hamada et al. | 62/186 |
| 7,992,630 B2 * | 8/2011 | Springer et al. | 165/238 |
| 7,997,506 B2 * | 8/2011 | Kim | 236/91 F |
| 2002/0124992 A1 * | 9/2002 | Rainer et al. | 165/11.1 |
| 2003/0192328 A1 * | 10/2003 | Kikuchi et al. | 62/141 |
| 2004/0083029 A1 * | 4/2004 | Bicknell | 700/276 |
| 2005/0155363 A1 * | 7/2005 | Shah | 236/44 C |
| 2005/0239393 A1 * | 10/2005 | Reese | 454/251 |
| 2006/0100744 A1 | 5/2006 | Sharma et al. | |
| 2007/0156256 A1 | 7/2007 | Jung | |
| 2007/0227721 A1 * | 10/2007 | Springer et al. | 165/291 |
| 2008/0029611 A1 * | 2/2008 | Schnell et al. | 236/44 C |
| 2008/0179409 A1 * | 7/2008 | Seem | 236/49.3 |
| 2009/0228151 A1 * | 9/2009 | Wang et al. | 236/44 C |
| 2009/0248854 A1 * | 10/2009 | Conway | 709/224 |
| 2009/0281667 A1 * | 11/2009 | Masui et al. | 700/276 |
| 2010/0312396 A1 * | 12/2010 | George | 700/278 |
| 2010/0312397 A1 * | 12/2010 | George | 700/278 |

OTHER PUBLICATIONS

Energy-Efficient Air Conditioning, DOE/GO-10099-379, FS206, Jun. 1999 (8 pages).

* cited by examiner

ENVIRONMENT CONTROL SYSTEM

RELATED APPLICATION

This application is a continuation-in-part application and claims priority to U.S. patent application Ser. No. 12/780,049, filed May 14, 2010, which is based on and claims priority to U.S. Provisional Patent Application Ser. No. 61/268,132, filed on Jun. 8, 2009, the entire disclosures of which are hereby expressly incorporated herein by reference.

FIELD OF THE DISCLOSURE

The present disclosure relates to the environmental control of the interior of confined spaces. More particularly, the present disclosure relates to a system and method for controlling the heating, cooling, and humidity levels of the interior of buildings.

BACKGROUND OF THE DISCLOSURE

Environmental control of confined spaces is generally accomplished through the use of heating, ventilating, and air conditioning ("HVAC") systems or through the opening of windows and doors. Generally, a thermostat is used to control HVAC systems, whereas a person is required for manually opening and closing doors and windows.

In general HVAC systems include a thermostat and temperature sensors for determining the temperature within the confined space. Users input desired temperature settings into the thermostat and when the temperature within the confined space is determined to be different from the desired temperature setting, the thermostat acts as an on switch for the HVAC system to bring the temperature within the confined space to the desired temperature setting. Likewise, when the temperature within the confined space is determined to be equal to the desired temperature setting, the thermostat acts as an off switch for the HVAC system.

Since the mid-1950's energy demand for heating and cooling buildings has risen. For example, approximately twenty percent of the electricity generated in the United States is used only for cooling buildings. As the demand for energy to cool and heat buildings has increased, costs to energy consumers have also risen. Additionally, pollution caused by the production of energy for heating and cooling buildings has also increased.

As a result of the increased energy consumption, pollution, and costs resulting from heating and cooling buildings, manufacturers and consumers of heating and cooling systems have placed a greater focus on energy conservation. For example, some users may attempt to limit their personal use of air conditioning or furnace systems. Additionally, some thermostats allow users to input different desired temperature settings for different time periods on specific days (e.g., when in a heating mode allowing the user to set a lower desired temperature setting for hours the user is at work) in order to reduce the overall operational time of their HVAC system. Further, the U.S. Department of Energy implemented the Seasonal Energy Efficiency Ratio (SEER) in order to regulate energy consumption by air conditioners. For at least these reasons, systems and methods which reduce the energy consumption required to control the heating, cooling, and humidity levels of confined spaces are important for decreasing energy demand, pollution, and consumer energy costs.

SUMMARY

The present disclosure provides a control system for governing temperature and/or humidity levels within a confined space having a controller communicatively coupled to a cooling system, a heating system, a duct system, a plurality of environmental sensors for detecting temperature and humidity levels within the confined space and external to the confined space, and an external air intake for introducing air external to the confined space to within the confined space. The control system may further include predictive heating and predictive cooling configurations having a computing device communicatively connected to the controller and to an environmental forecast source.

According to the present disclosure, a control system for governing temperature levels within a confined space having a heating system, a cooling system, and a thermostat controller operatively coupled to the heating system and the cooling system is provided. The control system includes: a plurality of environmental sensors adapted to detect temperature levels where at least one environmental sensor adapted to detect temperature levels is positioned within the confined space and at least one environmental sensor adapted to detect temperature levels is positioned external to the confined space; a controller communicatively coupled to the plurality of environmental sensors, the controller having an input and a machine readable media, the input adapted to receive a plurality of settings including a high temperature tolerance setting and a low temperature tolerance setting, the controller adapted to compare the temperature level within the confined space, the temperature level external to the confined space, and the plurality of settings to a plurality of predefined rules for governing the generation of commands by the controller; and an external air intake operatively coupled to the controller and adapted to introduce air from outside the confined space into the confined space, wherein the controller generates commands for operating the external air intake when the temperature level within the confined space is greater than the high temperature tolerance setting or lower than the low temperature tolerance setting and the temperature level external to the confined space is less than the high temperature tolerance setting but is greater than the low temperature tolerance setting.

According to another embodiment of the present disclosure, a method is provided for governing temperature levels and humidity levels within a confined space. The method includes the steps of: inputting a plurality of settings into a memory of a system controller, the plurality of settings including a high temperature tolerance setting, a low temperature tolerance setting, a high humidity limit setting, and a low humidity limit setting; detecting temperature and humidity levels within the confined space and external to the confined space; communicating the detected temperature and humidity levels to the system controller; comparing, by way of the system controller, the detected temperature and humidity levels within the confined space and external to the confined space and the plurality of settings input into the memory of the system controller to a plurality of predefined rules; and generating a command for operating one of an external air intake system, a cooling system, or a heating system. The command for operating one of an external air intake system, a cooling system, or a heating system is generated by the system controller based on the comparison of the plurality of predefined rules to the detected temperature and humidity levels and the inputted plurality of settings.

According to yet another embodiment of the present disclosure, a control system for governing temperature levels and humidity levels within a confined space is provided. The control system includes: a plurality of environmental sensors capable of detecting humidity levels and temperature levels, wherein at least one environmental sensor capable of detecting humidity levels is positioned within the confined space, at least one environmental sensor capable of detecting humidity levels is positioned external to the confined space, at least one environmental sensor capable of detecting temperature levels is positioned within the confined space, and at least one environmental sensor capable of detecting temperature levels is positioned external to the confined space; a controller communicatively coupled to the plurality of environmental sensors, the controller having an input, a memory, and a machine readable media, the input capable of receiving a command for performing one of a predictive cooling mode and a predictive heating mode and capable of receiving a plurality of settings including a high temperature tolerance setting, a low temperature tolerance setting, a high humidity limit setting, a low humidity limit setting, a predictive low temperature tolerance setting, a predictive high temperature tolerance setting, a predictive low humidity tolerance setting, a predictive high humidity tolerance setting, and a reaction time setting, the memory capable of storing for a period of time the plurality of settings received by the input and the humidity levels and temperature levels detected by the plurality of environmental sensors and communicated to the controller; a heating system having a heating element capable of heating the air within the confined space and a humidifier capable of increasing the humidity level of the air within the confined space, the heating system operatively coupled to the controller; a cooling system having a cooling element capable of cooling the air within the confined space and a dehumidifier capable of decreasing the humidity level of the air within the confined space, the cooling system operatively coupled to the controller; an external air intake operatively coupled to the controller and capable of introducing air from outside the confined space into the confined space; a duct system operatively connecting the confined space to the heating system, the cooling system, and the external air intake; and a computing device communicatively coupled to the controller and an environmental forecast source, the environmental forecast source capable of providing the computing device forecast temperature levels and forecast humidity levels for a specific location at specified periods in time in the future, the computing device capable of communicating the forecast temperature levels and forecast humidity levels to the controller. The machine readable media of the controller is capable of comparing the temperature level and humidity level within the confined space, the temperature level and humidity level external to the confined space, the inputted plurality of settings, and the inputted command for performing one of a predictive cooling mode or a predictive heating mode, to a plurality of predefined rules for governing the generation of commands by the controller. The controller generates a command for operating the external air intake when the command for performing the predictive cooling mode is input into the controller and the temperature level external to the confined space is less than the high temperature tolerance setting, the external humidity level is less than or equal to the predictive high humidity tolerance setting and the forecast temperature level for a point in time in the future less than the present moment in time plus the reaction time setting forecasts the temperature level external to the confined space to be greater than or equal to the low temperature tolerance setting.

Additional features and advantages of the present disclosure will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

Corresponding reference characters indicate corresponding parts throughout the several views. The exemplifications set out herein illustrate exemplary embodiments of the disclosure and such exemplifications are not to be construed as limiting the scope of the disclosure in any manner.

DETAILED DESCRIPTION OF THE DRAWINGS

The embodiments of the disclosure described herein are not intended to be exhaustive or to limit the disclosure to the precise forms disclosed. Rather, the embodiments selected for description have been chosen to enable one skilled in the art to practice the subject matter of the disclosure. Although the disclosure describes specific configurations of a control system for governing temperature and humidity levels within a confined space, it should be understood that the concepts presented herein may be used in other various configurations consistent with this disclosure.

Figure 1:
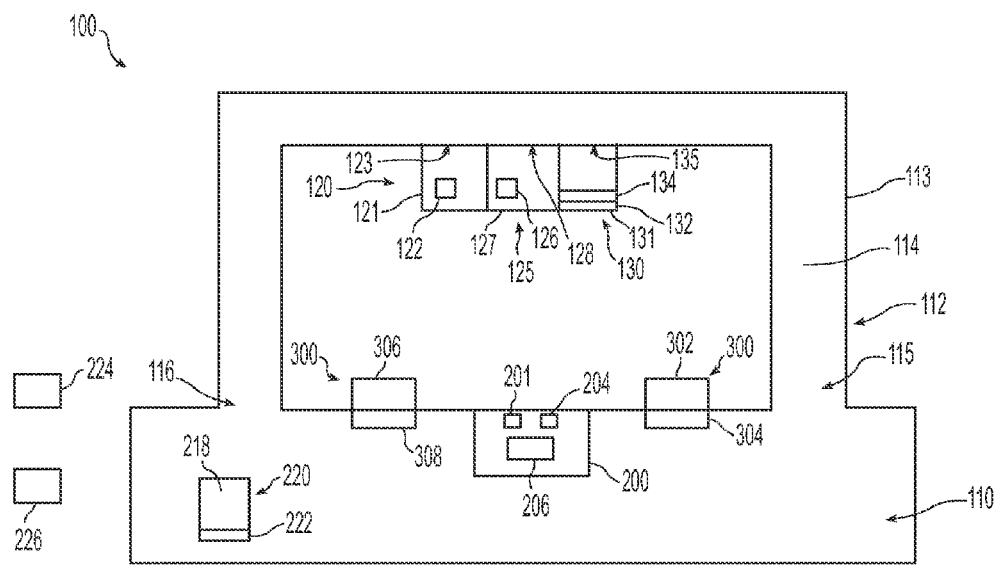
FIG. 1 is a schematic view of an exemplary environmental control system of the present disclosure.
Figure 2:
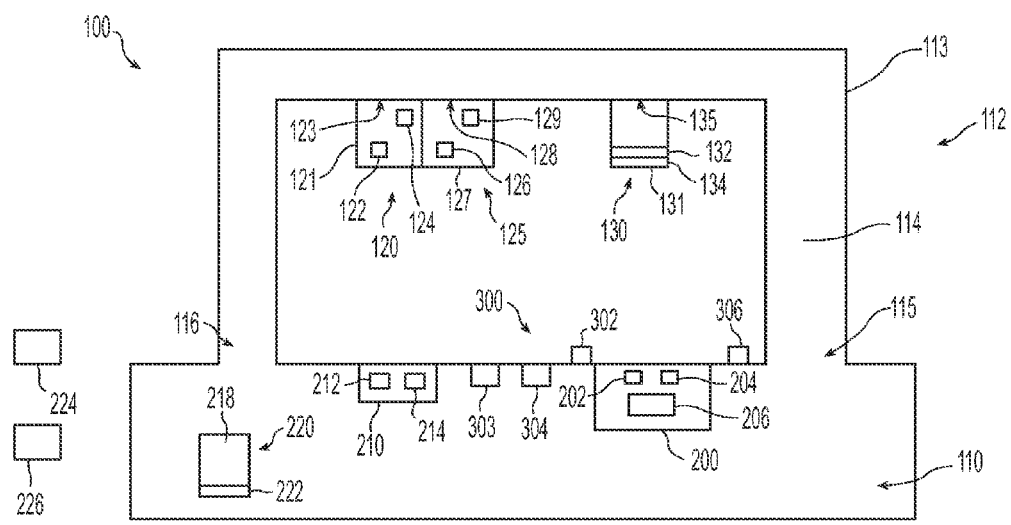
FIG. 2 is schematic view of another exemplary environmental control system of the present disclosure.
Figure 3:
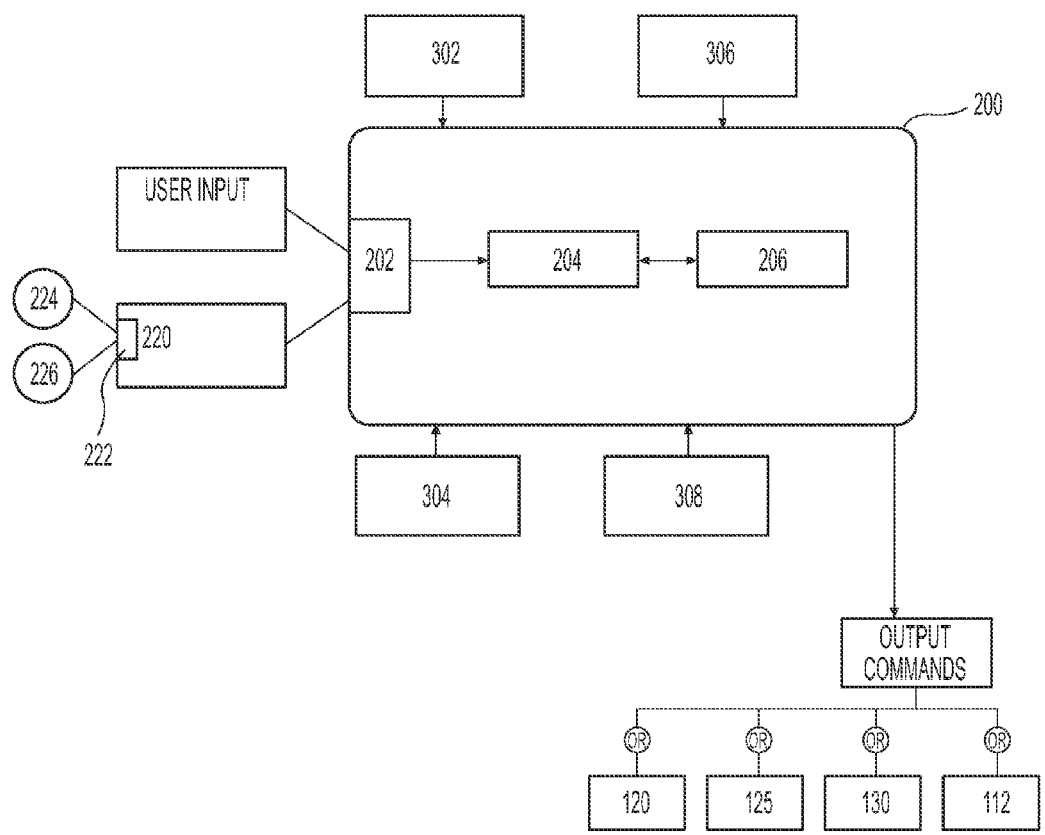
FIG. 3 is a flow chart of exemplary input and output of a controller of the present disclosure.
Figure 4:
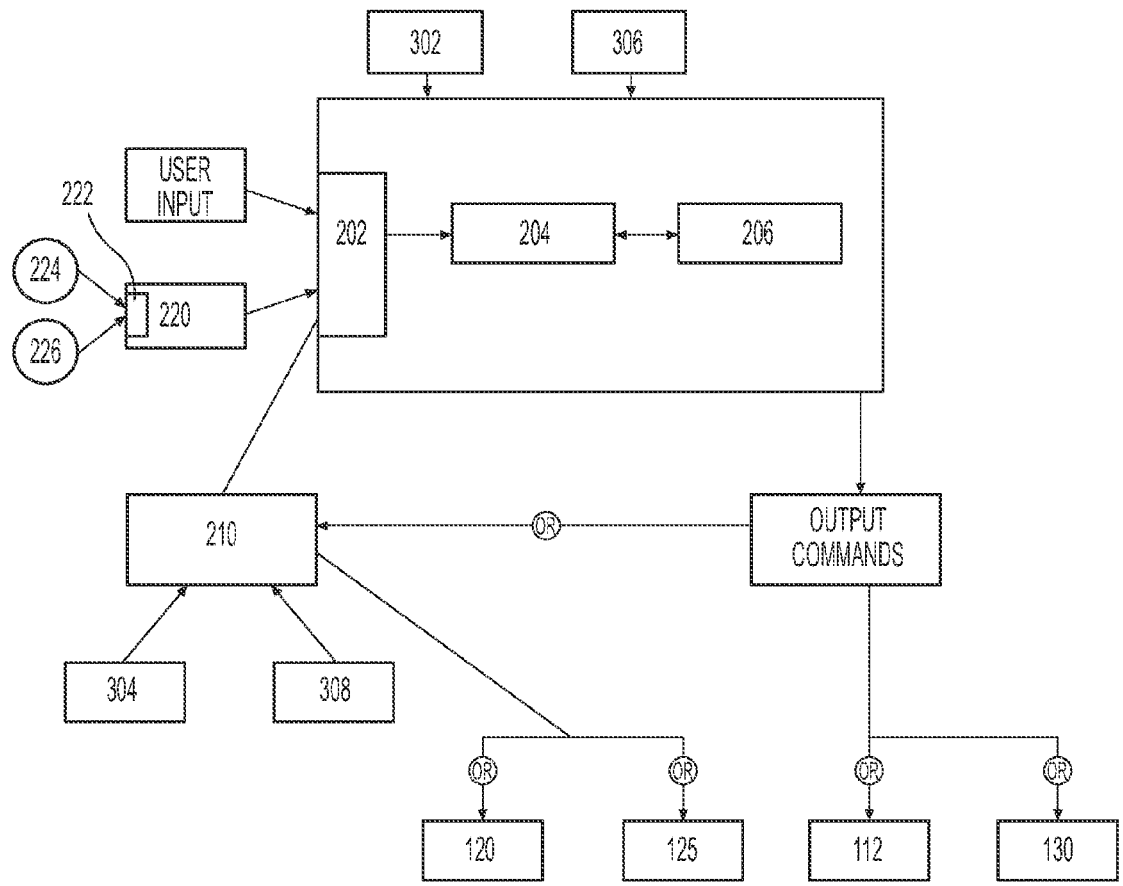
FIG. 4 is a flow chart of another exemplary input and output of a controller of the present disclosure.

Referring to FIGS. 1 and 2, a control system 100 for governing the temperature and/or humidity levels within a confined space 110 is illustrated including a controller 200, a plurality of environmental sensors 300, an external air intake 130, a cooling system 120, a heating system 125, and a duct system 112. FIGS. 1 and 3 depict an integrated configuration of control system 100 in which controller 200 may singularly govern the operation of cooling system 120, heating system 125, and external air intake 130. FIGS. 2 and 4 alternatively depict an add-on configuration of control system 100 in which a thermostat 210 is operatively coupled to, and capable of governing the operation of heating system 125 and cooling system 120. Further, while control system 100 is depicted in FIGS. 1 and 2 as simultaneously governing both temperature and humidity levels of confined space 110, control system 100 may be used for governing only temperature levels or only humidity levels within confined space 110 in accordance with the teaching disclosed herein.

Confined space 110 is illustrated in FIGS. 1 and 2 as an enclosed area operatively connected to duct system 112. While confined space 110 is generally described and depicted herein as a building, such as a house or office, or a portion thereof, the system and method described herein may also be used in the governing of temperature and humidity levels within mobile confined spaces, such as an automobile or recreational vehicle.

As further illustrated in FIGS. 1 and 2, duct system 112 is operatively connected to confined space 110. Duct system 112 operatively connects heating system 125, cooling system 120, and external air intake 130 with confined space 110. In the illustrated embodiments, duct system 112 includes duct portion 113 which defines duct conduit 114, entry portion 116, and exit portion 115.

Duct conduit 114 provides a path by which air is capable of passing between confined space 110 and any of heating system 125, cooling system 120, and external air intake 130. Further, in some configurations duct conduit 114 may provide a path by which air is capable of passing from external air intake 130 to heating system 125 and/or cooling system 120 before passing into confined space 110 at entry portion 116.

Also, FIGS. 1 and 2 depict entry portion 116 comprising the area or areas where air leaves duct system 112 and enters confined space 110. Exit portion 115 comprises the area or areas where air within confined space 110 leaves confined space 110 and enters duct system 112. While entry portion 116 and exit portion 115 are represented in FIGS. 1 and 2 comprising only one area, respectively, it should be appreciated that entry portion 116 and exit portion 115 may comprise a plurality of areas respectively.

Additionally, although not specifically illustrated in FIGS. 1 and 2, it should be appreciated that embodiments of duct system 112 exist in which duct system 112 includes air filtering systems (not depicted), fan systems (not depicted), and one or more dampers (not depicted). For example, embodiments of duct system 112 having a filter, or series of filters, at one or more entry portion 116 are possible. Also, embodiments of duct system 112 having a fan system, for pulling air within confined space 110 into duct system 112, at one or more exit portion 115 are possible. In another exemplary embodiment, duct system 112 may include a fan system within duct conduit 114 for forcing air within duct conduit 114 towards entry portion 116.

Further, duct system 112 may also include, as is common in HVAC systems, one or more dampers (not shown) for directing the flow of air within duct system 112. As is also common in HVAC systems, duct system 112 may include an exhaust duct portion (not shown) for allowing air within duct conduit 114 to be released into the external air. It should be understood that controller 200 and/or thermostat 210 may operatively communicate to duct system 112 for governing the functions of one or more of the air filter system, fan system, and dampers.

Referring to FIGS. 1 and 2, heating system 125 is illustrated having heating unit 127, such as a furnace including heating element 126, such as a heat exchanger. Also illustrated in the embodiments of FIGS. 1 and 2 is heated air supply region 128 which allows for the introduction of air, heated by heating system 125, into duct conduit 114 of duct system 112. Heating system 125, as depicted in FIG. 2, may further include a humidifier 129 for increasing the level of humidity in the air heated by heating system 125 prior to the heated air being introduced into confined space 110.

Also depicted in FIGS. 1 and 2, cooling system 120 is illustrated including cooling unit 121, such as an air conditioner having a cooling element 122, such as an evaporator or evaporative coil for example. Also illustrated in the embodiments of FIGS. 1 and 2 is cooled air supply region 123 which allows for the introduction of air, cooled by cooling system 120, into duct conduit 114 of duct system 112. As depicted in FIG. 2, cooling system 120 may further include a dehumidifier 124 for decreasing the level of humidity in the air cooled by cooling system 120 prior to the cooled air being introduced into confined space 110.

Continuing with FIGS. 1 and 2, external air intake 130 is illustrated including intake unit 131, filter 132, intake fan 134, and external air supply region 135. As depicted in the embodiments of FIGS. 1 and 2, external air intake 130 introduces external air into duct system 112 at external air supply region 135.

FIGS. 1 and 2 further illustrate filter 132 and intake fan 134 as disposed within intake unit 131. In the embodiment of external air intake 130 depicted in FIG. 1, intake fan 134 is disposed between filter 132 and external air supply region 135. As arranged in FIG. 1, intake fan 134 provides a force drawing external air into intake unit 131, where the external air passes through filter 132 then through or around intake fan 134 before passing into duct system 112 at external air supply region 135. Alternatively, as depicted in FIG. 2 filter 132 may be disposed between intake fan 134 and external air supply region 135. As arranged in FIG. 2, intake fan 134 provides a force drawing external air into intake unit 131 where the external air passes through or around intake fan 134 before passing through filter 132 and then into duct system 112 at external air supply region 135. Further, while intake fan 134 and filter 132 have been described and depicted herein as disposed within intake unit 131, embodiments of external air intake 130 in which intake fan 134 and/or filter 132 may be disposed within duct system 112, or as a portion thereof, and not within intake unit 131 are possible.

Referring next to FIGS. 1-4, control system 100 further includes plurality of environmental sensors 300. As illustrated, plurality of environmental sensors 300 includes an external humidity sensor 306, an external temperature sensor 302, an internal humidity sensor 308, and an internal temperature sensor 304.

As illustrated in FIGS. 1 and 2, external humidity sensor 306 and external temperature sensor 302 are positioned external to confined space 110. Further, as depicted in FIGS. 3 and 4, external humidity sensor 306 and external temperature sensor 302 are communicatively connected to controller 200.

The embodiments of a plurality of environmental sensors 300 depicted in FIGS. 1 and 2, illustrate internal humidity sensor 308 and internal temperature sensor 304 positioned within confined space 110. As illustrated in FIG. 3, internal humidity sensor 308 and internal temperature sensor 302 may be communicatively connected to controller 200. FIG. 4 depicts an embodiment of a plurality of environmental sensors 300 in which internal humidity sensor 308 and internal temperature sensor 304 may be communicatively connected to thermostat 210.

Further, while the embodiments of control system 100 described and depicted herein refer to a plurality of environmental sensors 300 as comprising a single external humidity sensor 306, external temperature sensor 302, internal humidity sensor 308, and internal temperature sensor 304, respectively, configurations of control system 100 having multiple external humidity sensors 306, external temperature sensors 302, internal humidity sensors 308, and internal temperature sensors 304, respectively, are possible. Additionally, while the embodiments of control system 100 described and depicted herein refer to plurality of environmental sensors 300 as comprising separate components for external humidity sensor 306, external temperature sensor 302, internal humidity sensor 308, and internal temperature sensor 304, respectively, configurations of control system 100 in which external humidity sensor 306 and external temperature sensor 302 are the same component and/or internal humidity sensor 308 and internal temperature sensor 304 are the same component are possible.

Again referring to FIGS. 1-4, control system 100 further includes controller 200 operatively connected to heating system 125, cooling system 120, external air intake 130, and duct system 112. The illustrated embodiments of controller 200, as depicted in FIGS. 1-4, include an input 202, a memory 204, and a machine readable media 206. While controller 200 is described and depicted herein as including a single component including memory 202, input 202, and machine readable media 206, embodiments of controller 200 in which one or more of memory 202, input 202, and machine readable media 206 are a separate component, but communicatively connected to controller 200, may exist.

With reference to FIGS. 3 and 4, input 202 receives a plurality of settings from a user (not shown). While not depicted in FIGS. 3 and 4, input 202 may also receive information provided to controller 200 via a plurality of environmental sensors 300. In general, input 202 comprises an interface associated with controller 200. In one exemplary embodiment, input 202 comprises an electronic interface which a user may manually touch, press, or verbally operate, for inputting values for one or more of the plurality of settings. Input 202 may also comprise a port device (such as a universal serial bus port or other modular connector port such as an RJ11 or 4P4C port), allowing plurality of environmental sensors 300 to communicate environmental information to input 202 and/or allowing a user to communicate one or more of the plurality of settings through wired connections, for example by way of a keyboard.

In another exemplary embodiment, input 202 comprises an interface capable of electronically communicating with remote device 226 (FIG. 1). For example, input 202 may comprise a radio wave or micro wave receiver allowing a plurality of environmental sensors 300 to communicate environmental information to input 202 and/or allowing a user to communicate any of the plurality of settings to input 202 via a remote device such as a cell phone, remote control, personal digital assistant, or the like. Embodiments of input 202 allowing a user to communicate settings to controller 200 remotely may further include input 202 comprising a network card, allowing a user to communicate one or more of the plurality of settings over an internet connection. Additionally, controller 200 may include an internet protocol (IP) address for communicatively connecting to a network router. Remote device 226, connectable to the internet, may communicate with controller 200 by connecting to the IP address assigned to controller 200, for example. Remote communication with controller 200 may also be secured, for example by password protection or the like.

Controller 200, as illustrated in FIGS. 1-4, further includes memory 204. Memory 204 is communicatively connected to input 202 and is capable of receiving and storing (for a period of time) the plurality of settings provided to controller 200 via input 202. Memory 204 is also adapted to receive and store (for a period of time) the information provided to controller 200 via plurality of environmental sensors 300. For example, memory 204 may store information provided to controller 200 via external temperature sensor 302 of plurality of environmental sensors 300 until controller 200 is provided more recent information from external temperature sensor 302. Storing information provided to controller 200 allows controller 200 to generate output commands (FIGS. 3 and 4) at desired times, as described herein, either automatically or through user interaction.

As illustrated in FIGS. 1-4, controller 200 also includes machine readable media 206. Machine readable media 206, as depicted in FIGS. 3 and 4, may be communicatively connected to memory 204 and is adapted to be executed by controller 200 in performing comparisons and/or analysis of information provided to controller 200 (via plurality of environmental sensors 300) to the plurality of settings inputted by a user. For example, machine readable media 206 may include a plurality of instructions, such as a software program, operable to be executed by controller 200. Further, while machine readable media 206 is generally described and depicted herein as communicatively connected to memory 204, embodiments of controller 200 in which machine readable media 206 is directly connected to input 202 are possible.

Referring to FIGS. 1-4, embodiments of control system 100 further including an environmental forecast source 224 and a computing device 220 are illustrated.

In general, environmental forecast source 224 comprises an accessible informational source, such as a website, which is capable of providing environmental information, including temperature and humidity forecasts, for a specific location at specific times in the future. For example, one embodiment of environmental forecast source 224 may comprise a website, accessible by other computing devices at a given uniform resource identifier (URI), which provides temperature and humidity forecast information for a specific location (which may be defined by latitudinal and longitudinal coordinates, zip code, city and state designations, or the like) for every hour over a given period of time in the future. An exemplary embodiment of environmental forecast source 224 is the AccuWeather internet service provided by AccuWeather, Inc., of State College, Pa.

Environmental forecast source 224 may passively provide environmental information to remote computing devices, such as computing device 220, by allowing remote computing devices to access the environmental information stored on a server. Further, environmental forecast source 224 may provide environmental information actively by transmitting the environmental information to specific remote computing devices (e.g., specified by internet protocol addresses) at given intervals of time. Environmental forecast source 224, computing device 220, and/or controller 200 may be configured to cause environmental information, provided to controller 200, to be updated (e.g., provided to controller 200 again) at given intervals of time, for example every 30 minutes. While environmental forecast source 224 has been described and depicted herein in terms of temperature and humidity predictions, embodiments of environmental forecast source 224 which provide other forms of environmental information such as dew points, thunderstorm information, smog levels, and the like, are also possible.

Referring to FIGS. 1-4, computing device 220 is depicted as including software 218 and communication component 222 and communicatively connected to controller 200. Software 218 is capable of receiving and/or retrieving environmental information from environmental forecast source 224. Upon receipt and/or retrieval of environmental information, software 218 may further translate environmental information into predictive temperature information and predictive humidity information for use by controller 200.

Computing device 220 further includes communication component 222. As illustrated in FIGS. 3 and 4, computing device 220 may facilitate communication with/or between external devices such as environmental forecast source 224 or remote device 226. Communication component 222 may also facilitate communication with controller 200. For example, communication component 222 may facilitate communication of the predictive temperature information and predictive humidity information (translated from environmental information by software 218) to controller 200.

Further, as illustrated in FIGS. 3 and 4, communication component 222 may provide for communication between computing device 220 and remote device 226. For example, an exemplary embodiment of control system 100 may include communication component 222 comprising an internet protocol (IP) address, allowing remote device 226, such as a personal computer, to communicate with computing device 220 over the internet. Embodiments of control system 100, in which remote device 226 may remotely communicate with computing device 220, may allow a remote user to provide updates and/or changes to the plurality of settings to computing device 220. Computing device 220 may then communicate the updates and/or changes to controller 200.

Having described the various portions and components of control system 100, the operation thereof will now be discussed. Referring to FIGS. 3 and 4 and box 10 of FIGS. 5-8, input 202 receives a plurality of settings from a user. As listed in various configurations of control system depicted in box 10 of FIGS. 5-8, the plurality of settings received by input 202 may include any of: desired temperature setting, a desired humidity setting, a high temperature tolerance setting, a low temperature tolerance setting, a temperature differential setting, a high humidity tolerance setting, a low humidity tolerance setting, a high humidity limit setting, a low humidity limit setting, a predictive low temperature tolerance setting, a predictive high temperature tolerance setting, a predictive low humidity tolerance setting, a predictive high humidity tolerance setting, a forecast horizon setting, and a reaction time setting.

In general, the desired temperature setting and the desired humidity setting indicate the temperature and the humidity, within confined space 110, a user prefers. The high temperature tolerance setting and the high humidity tolerance setting indicate the amount of increase in temperature and humidity from the desired temperature setting or desired humidity setting, within confined space 110, a user will tolerate before preferring that control system 100 activate either cooling system 120 or external air intake 130 to lower the temperature and/or humidity within confined space 110 (see FIGS. 5 and 7). Likewise, the low temperature tolerance setting and the low humidity tolerance setting indicate the amount of decrease in temperature or humidity from the desired temperature setting or the desired humidity setting, within confined space 110, the user will tolerate before preferring that control system 100 activate either heating system 125 or external air intake 130 to increase the temperature and/or humidity within confined space 110. Additionally, the high temperature tolerance setting and the low temperature tolerance setting indicate a range of temperature external air must fall between in order for control system 100 to utilize external air intake 130 in governing the temperature levels within confined space 110.

The temperature differential setting indicates a temperature amount, for example two to four degrees, which is added to the desired temperature setting when cooling with external air. For example, if control system 100 is utilizing external air intake 130 to cool confined space 110, and desired temperature setting is seventy degrees and differential setting is two degrees, external air will cool confined space 110 to seventy-two degrees. After cooling confined space to seventy-two degrees, cooling system 120 may be utilized to reach the desired temperature setting of seventy degrees.

The high humidity limit setting indicates an amount of humidity, in the external air, above the high humidity tolerance setting the user would tolerate when cooling confined space 110 with external air using external air intake 130. Thus, the humidity level of external air must be below the high humidity limit setting in order for control system 100 to utilize external air intake 130 in cooling confined space 110. Likewise, the low humidity limit setting indicates an external air humidity level, below the low humidity tolerance setting, the user would tolerate when heating confined space 100 with external air using external air intake 130. Thus, the humidity level of external air must be above the low humidity limit setting in order for control system 100 to utilize external air intake 130 in heating confined space 110.

The predictive high temperature tolerance setting, predictive low temperature tolerance setting, predictive high humidity tolerance setting, and predictive low humidity tolerance setting indicate ranges of temperature and humidity, respectively, within confined space 110 a user will tolerate under specific circumstances (described herein) for minimizing the use of heating system 125 and/or cooling system 120 through predictive utilization of external air intake 130. The predictive high temperature tolerance setting, predictive low temperature tolerance setting, predictive high humidity tolerance setting, and predictive low humidity tolerance setting are, in general, ranges greater than the ranges provided by the high temperature tolerance setting, the low temperature tolerance setting, the high humidity tolerance setting, and the low humidity tolerance setting.

The forecast horizon setting operates in conjunction with the predictive temperature and predictive humidity settings and indicates a point in time in the future up to which environmental forecast information will be provided to controller 200. The forecast horizon setting may be input by the user or include a default value, for example twelve hours in the future from the present point in time. The reaction time setting also operates in conjunction with the predictive temperature and predictive humidity settings and indicates the amount of time required to either heat or cool confined space 110 a specific temperature level. The reaction time setting may be manually input by the user or may be derived through execution of machine readable media 206 of controller 200 using information provided to controller 200 by plurality of environmental sensors 300 and/or the plurality of settings input by a user.

As illustrated in FIGS. 3 and 4, input 202 receives the one or more of the plurality of settings described herein. Input 202 may receive any of the plurality of settings, or adjust previously provided settings, from a user manually or by communication with remote device 226. Once received by input 202, the plurality of settings are capable of being stored by memory 204 or controller 200 for future reference. In one exemplary embodiment of control system 100, a user may input a decreased low temperature tolerance setting into remote device 226 (e.g., a personal computer), which communicates with communication component 222 of computing device 220 over the internet. Computing device 220 then communicates the decreased low temperature tolerance setting to input 202 of controller 200 where the adjusted setting is stored in memory 204. While FIGS. 3 and 4 depict computing device 220 communicating the adjusted setting to input 202 of controller 200, it should be appreciated that embodiments in which computing device 220 may communicate directly with memory 204 and/or machine readable media 206 are possible.

Referring next to box 14 of FIGS. 5-8, external temperature sensor 302 and external humidity sensor 306 detect the temperature and humidity level, respectively, of the external air. As illustrated in FIGS. 3 and 4, external temperature sensor 302 and external humidity sensor 306 communicate the detected temperature and humidity level, respectively, to controller 200.

Referring next to box 12 of FIGS. 5-8, internal temperature sensor 304 and internal humidity sensor 308 detect the temperature and humidity level, respectively, within confined space 110. FIGS. 1 and 4 illustrate the integrated configuration of control system 100, depicting internal temperature sensor 304 and internal humidity sensor 308 communicating the detected temperature and humidity level information, respectively, directly to controller 200. However, FIGS. 2 and 4 illustrate the add-on configuration of control system 100 depicting internal temperature sensor 304 and internal humidity sensor 308 communicating the detected temperature and humidity level information, respectively, to thermostat 210 which then communicates the detected temperature and humidity level information to controller 200.

As depicted in FIGS. 3 and 4, once received by controller 200, the temperature and humidity level information relating to the external air and confined space 110 is capable of being stored by memory 204 of controller 200 for future reference.

Referring to box 16 of FIGS. 5-8, controller 200 (FIGS. 3 and 4) compares the detected temperature within confined space 110 to the high temperature tolerance setting and/or the low temperature tolerance setting stored within memory 204 (FIGS. 3 and 4). For example, in one embodiment of control system 100 a user must select an operational mode, such as cooling mode or heating mode. If a user selects cooling mode, in the exemplary embodiment, controller 200 may only compare detected temperature within confined space 110 to the low temperature tolerance setting. Likewise, if a user selects heating mode, in the exemplary embodiment, controller 200 may only compare detected temperature within confined space 110 to the high temperature tolerance setting. In another exemplary embodiment, however, user is not required to select an operation mode for control system 100 and controller 200 compares detected temperature within confined space 110 to both the high temperature tolerance setting and the low temperature tolerance setting.

As illustrated in box 18 of FIGS. 5-8, if the temperature within confined space 110 is less than or equal to the high temperature tolerance setting and greater than or equal to the low temperature tolerance setting, then control system 100 repeats the detection of the temperature and humidity level within confined space 110 and the detection of the external air temperature and humidity levels (see boxes 12 and 14, respectively).

Figure 5:
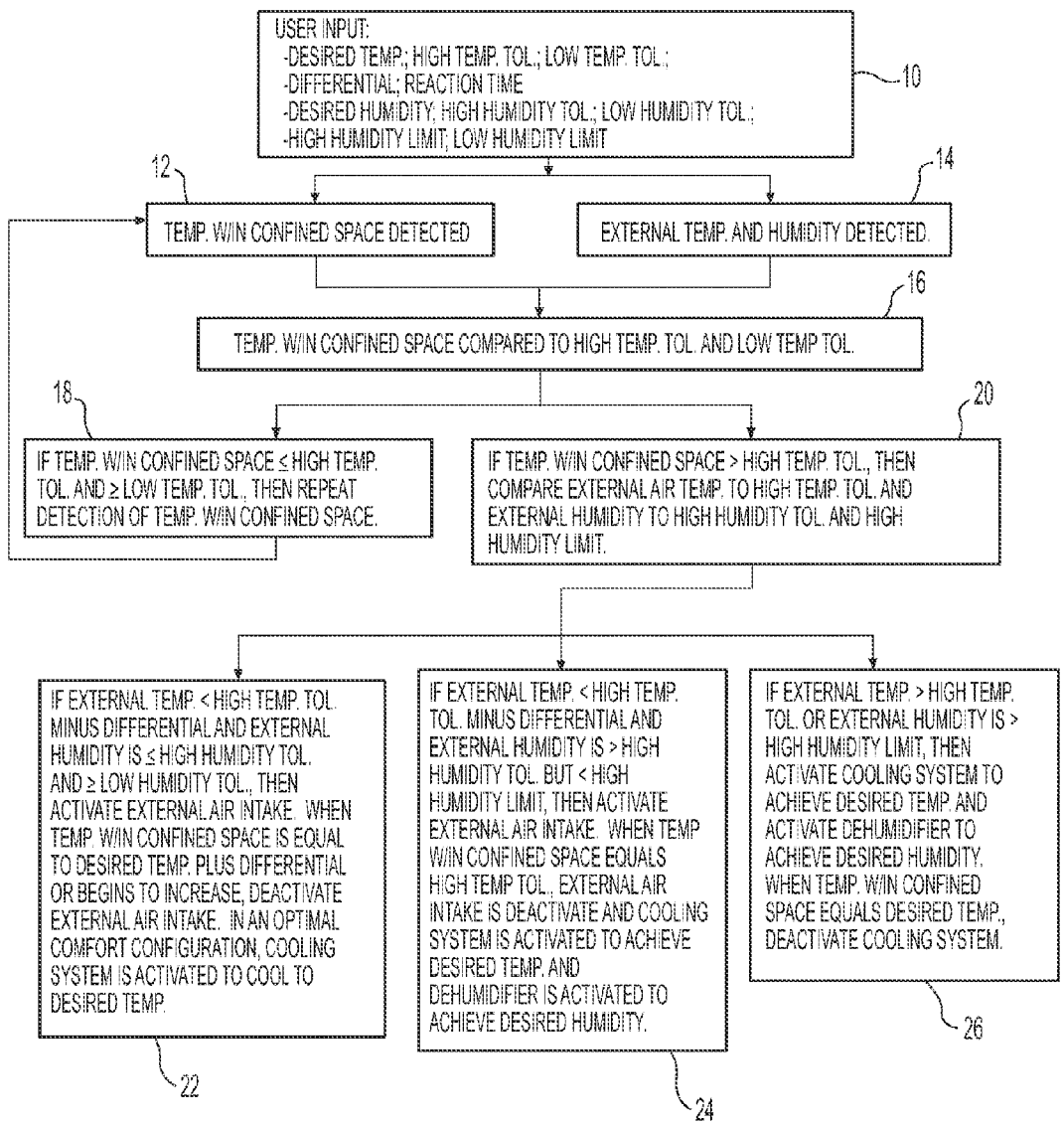
FIG. 5 is a flow chart of an exemplary method of the present disclosure.
Figure 7:
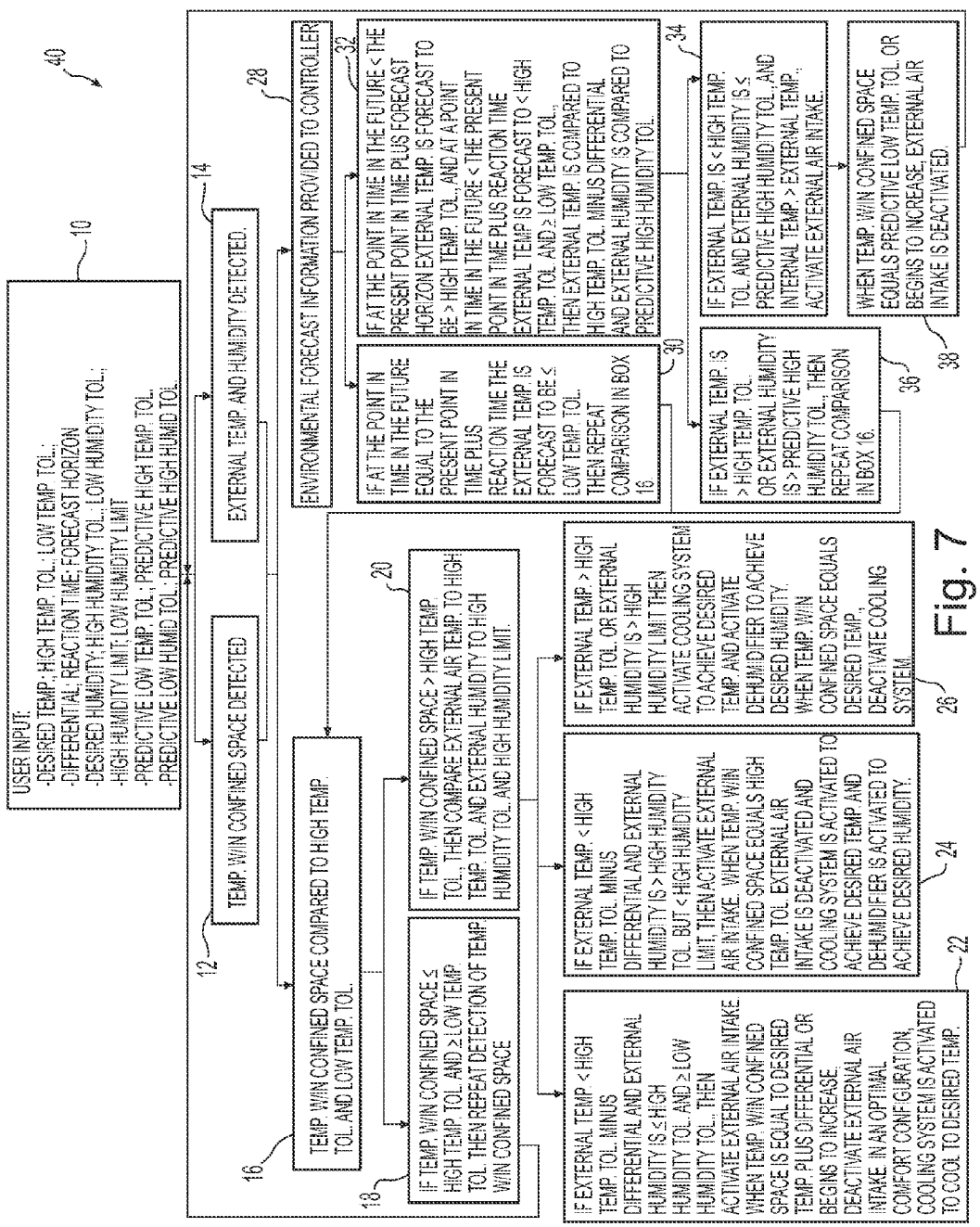
FIG. 7 is a flow chart of yet another exemplary method of the present disclosure.

With reference to FIGS. 5 and 7, a cooling operational mode of control system 100 is depicted. Referring first to box 20, if the temperature within confined space 110 is greater than the high temperature tolerance setting, then the external air temperature is compared to the high temperature tolerance setting. Also, the external humidity level is compared to the high humidity tolerance setting and the high humidity limit setting. Controller 200, based upon the comparison of the external air temperature and humidity levels to the plurality of settings (in box 20), generates output commands (FIGS. 3 and 4) for operating one, or possibly none, of external air intake 130 or cooling system 120 in the manner defined by boxes 20, 22, and 24 of FIGS. 5 and 7.

Referring next to box 22 of the cooling operational mode depicted in FIGS. 5 and 7, when controller 200 determines (as a result of the comparison performed in box 20 of FIGS. 5 and 7) the external air temperature is less than the high temperature tolerance setting minus the differential setting (if utilized), and the external humidity level is less than the high humidity tolerance, then controller 200 generates output commands (FIGS. 3 and 4) for operating external air intake 130. If no differential setting is utilized by the user, controller 200 generates commands for operating external air intake 130 when the external air temperature is determined to be less than the high temperature tolerance setting and the external humidity level is less than the high humidity tolerance. External air intake 130 is operated until the temperature within confined space 110 equals the desired temperature setting plus the differential setting (if utilized), at which point controller 200 generates output commands to deactivate external air intake 130. If differential setting is not utilized controller 200 generates output commands for deactivating external air intake 130 when the temperature within confined space 110 equals the desired temperature setting. Further, controller 200 generates output commands for deactivating external air intake 130 when the temperature within confined space 110 begins to increase.

Remaining with box 22 in FIGS. 5 and 7, one exemplary embodiment of the depicted cooling operational mode may allow a user the additional option of selecting an optimal comfort configuration. As illustrated in box 22, in the optimal comfort configuration of the depicted cooling operational mode, when confined space 100 is being cooled by external air intake 130 and temperature within confined space 110 is determined to be equal to the desired temperature setting plus the differential setting (if utilized) or the temperature within confined space 110 begins to increase, controller 200 generates output commands for operating cooling system 120. In the depicted optimal comfort configuration of box 22, cooling system 120 is operated until the temperature within confined space 110 equals the desired temperature setting.

Referring next to box 24 of the cooling operational mode depicted in FIGS. 5 and 7, when controller 200 determines (as a result of the comparison performed in box 20 of FIGS. 5 and 7) the external air temperature is less than the high temperature tolerance setting minus the differential setting (if utilized), and the external humidity level is greater than the high humidity tolerance setting but less than the high humidity limit setting, then controller 200 generates output commands (FIGS. 3 and 4) for operating external air intake 130. If differential setting is not utilized, controller 200 generates commands for operating external air intake 130 when the external air temperature is determined to be less than the high temperature tolerance setting and the external humidity level is less than the high humidity limit setting. External air intake 130 is operated until the temperature within confined space 110 equals the high temperature tolerance setting, at which point controller 200 generates output commands to deactivate external air intake 130 and operate cooling system 120. Cooling system 120 is operated until the temperature within confined space 110 equals the desired temperature setting. Further, cooling system 120 may include dehumidifier 124 (FIG. 1). Dehumidifier 124 may be activated in conjunction with cooling system 120 for bringing the humidity level within confined space 110 to the desired humidity setting.

Referring to box 26 of FIGS. 5 and 7, when controller 200 determines (as a result of the comparison performed in box 20 of FIGS. 5 and 7) the external air temperature is greater than the high temperature tolerance setting or the external air humidity level is greater than the high humidity limit setting, then controller 200 generates output commands (FIGS. 3 and 4) for operating cooling system 120. Cooling system 120 is operated until the temperature within confined space 110 equals the desired temperature setting. Further, dehumidifier 124 (FIG. 1) may be activated in conjunction with cooling system 120 for bringing the humidity level within confined space 110 to the desired humidity setting.

With reference to boxes 24 and 26 of FIGS. 5 and 7, cooling system 120, once activated may operate until the temperature within confined space 110 equals the desired temperature setting. In the exemplary embodiment of control system 100 illustrated in FIG. 2, thermostat 210 generates an output command to deactivate cooling system 120 when the temperature within confined space 110 equals the desired temperature setting. In the exemplary embodiment of control system 100 illustrated in FIG. 1, controller 200 generates an output command to deactivate cooling system 120 when the temperature within confined space 110 equals the desired temperature setting.

Figure 6:
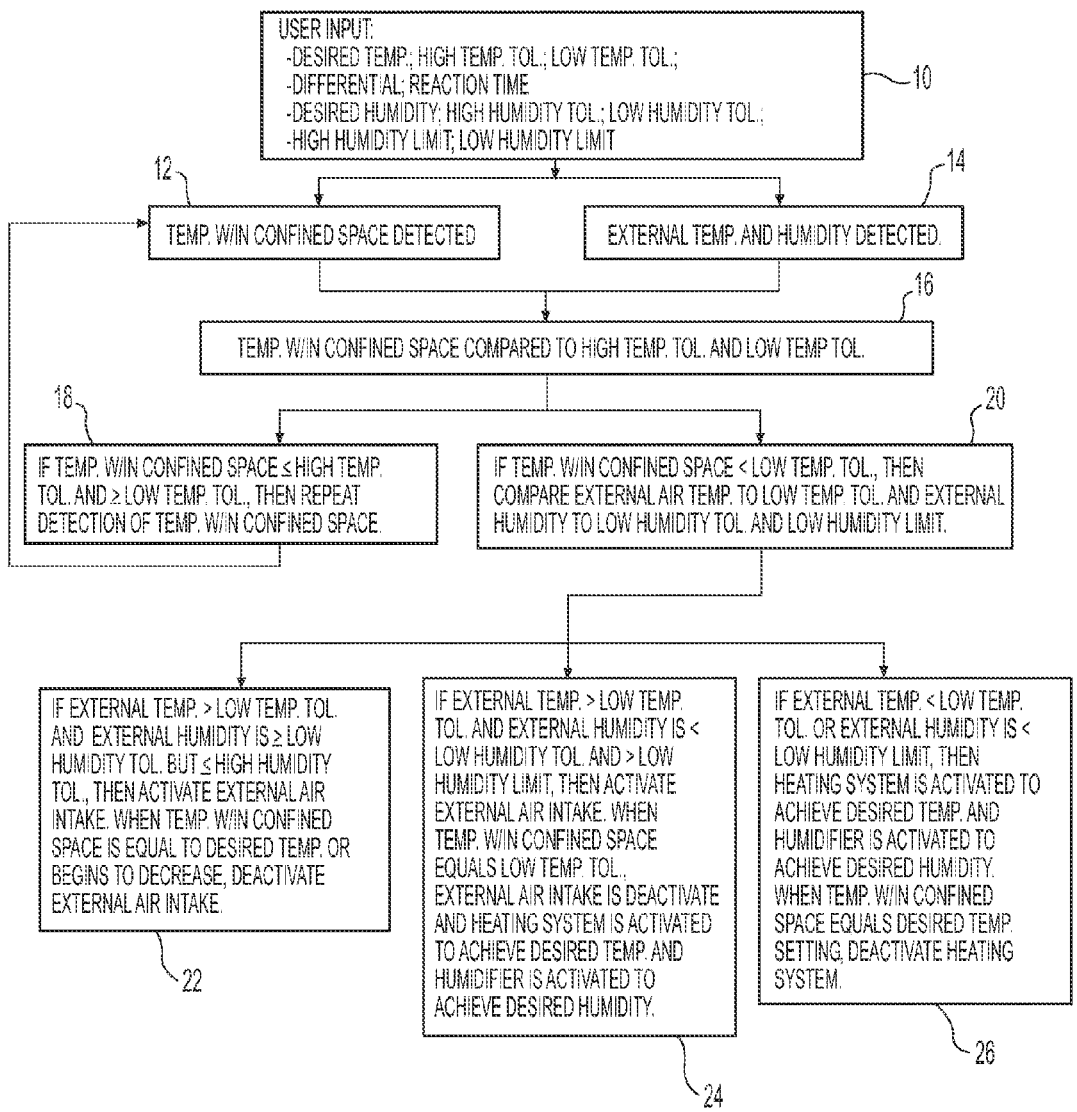
FIG. 6 is a flow chart of another exemplary method of the present disclosure.
Figure 8:
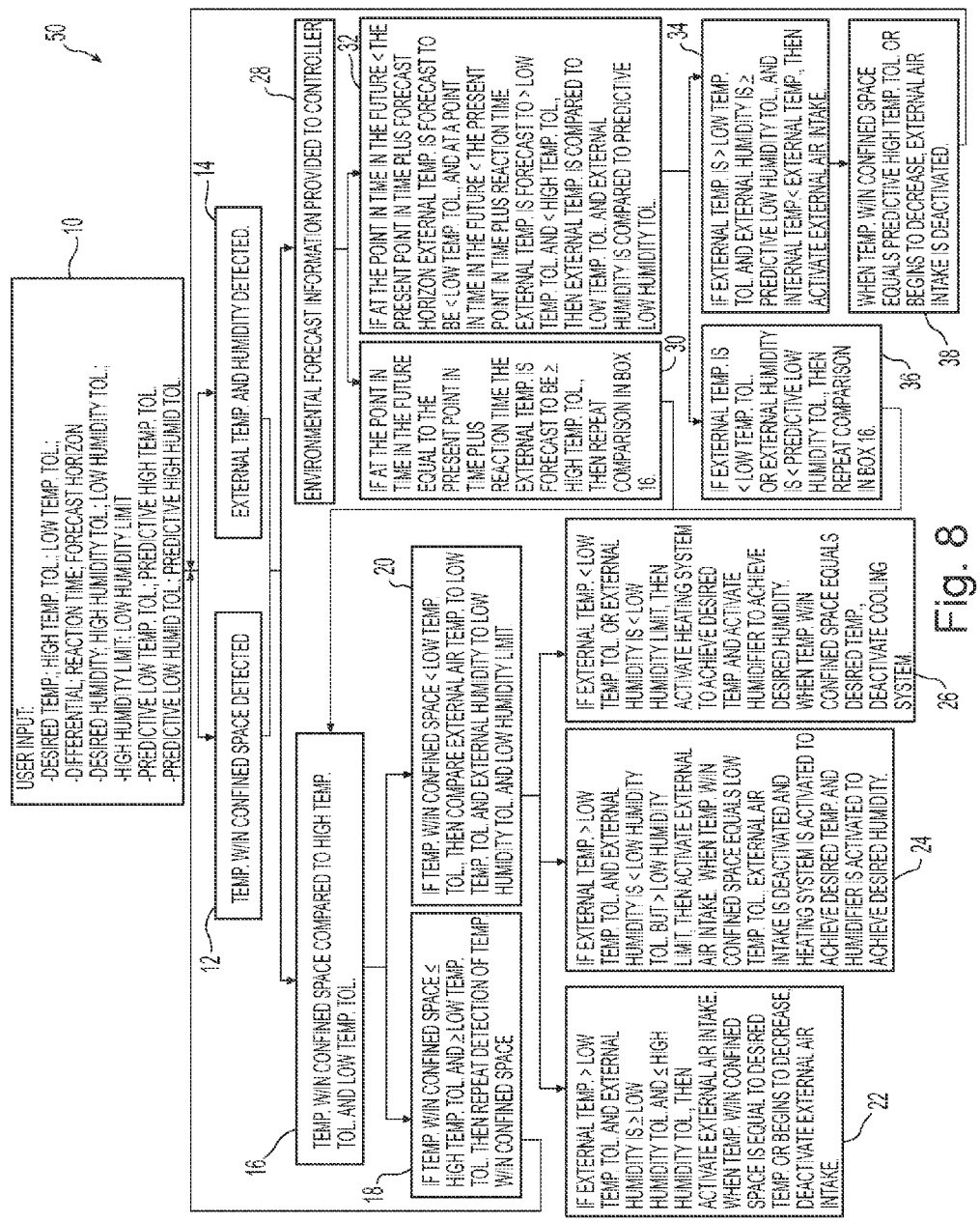
FIG. 8 is a flow chart of still yet another exemplary method of the present disclosure.

Referring next to FIGS. 6 and 8, a heating operational mode of control system 100 is depicted. Referring first to box 20, if the temperature within confined space 110 is less than the low temperature tolerance setting, then the external air temperature is compared to the low temperature tolerance setting and the external humidity level is compared to the low humidity tolerance setting and the low humidity limit setting. Controller 200, based upon the comparison of the external air temperature and humidity levels to the plurality of settings (in box 20), generates output commands (FIGS. 3 and 4) for operating one, or possibly none, of external air intake 130 or heating system 125 in the manner defined by boxes 22, 24, and 26 of FIGS. 6 and 8.

Referring first to box 22 of FIGS. 6 and 8, when controller 200 determines (as a result of the comparison performed in box 20 of FIGS. 6 and 8) that the external air temperature is greater than the low temperature tolerance setting and the external humidity level is greater than or equal to the low humidity tolerance setting but less than or equal to the high humidity tolerance setting, then controller 200 generates output commands (FIGS. 3 and 4) for operating external air intake 130. External air intake 130 is operated until the temperature within confined space 110 equals the desired temperature setting, at which point controller 200 generates output commands to deactivate external air intake 130. Further, controller 200 generates output commands to deactivate external air intake 130 if the temperature within confined space 110, detected by internal temperature sensor 304, begins to decrease.

Referring next to box 24 of the heating operational mode depicted in FIGS. 6 and 8, when controller 200 determines (as a result of the comparison performed in box 20 of FIGS. 6 and 8) the external air temperature is greater than the low temperature tolerance setting and the external humidity level is less than the low humidity tolerance setting but is greater than the low humidity limit setting, then controller 200 generates output commands (FIGS. 3 and 4) for operating external air intake 130. External air intake 130 is operated until the temperature within confined space 110 equals the low temperature tolerance setting, at which point controller 200 generates output commands to deactivate external air intake 130 and operate heating system 125. Heating system 125 is operated until the temperature within confined space 110 equals the desired temperature setting. Further, in one exemplary embodiment of control system 100, heating system 125 may include humidifier 129 (FIG. 1). Humidifier 129 may be operated in conjunction with heating system 125 for bringing the humidity level within confined space 110 to the desired humidity setting.

Referring to box 26 of FIGS. 6 and 8, when controller 200 determines (as a result of the comparison performed in box 20 of FIGS. 6 and 8) the external air temperature is less than the low temperature tolerance setting or the external air humidity level is less than the low humidity limit setting, then controller 200 generates output commands (FIGS. 3 and 4) for operating heating system 125. Heating system 125 is operated until the temperature within confined space 110 equals the desired temperature setting. Further, as illustrated in the embodiment of control system 100 of FIG. 1, heating system 125 may include humidifier 129. Humidifier 129 may be operated in conjunction with heating system 125 for bringing the humidity level within confined space 110 to the desired humidity setting.

With reference to boxes 24 and 26 of FIGS. 6 and 8, heating system 125, once activated may operate until the temperature within confined space 110 equals the desired temperature setting. In the exemplary embodiment of control system 100 illustrated in FIG. 2, thermostat 210 generates an output command to deactivate heating system 125 when the temperature within confined space 110 equals the desired temperature setting. In the exemplary embodiment of control system 100 illustrated in FIG. 1, controller 200 generates an output command to deactivate heating system 125 when the temperature within confined space 110 equals the desired temperature setting.

Control system 100, as described and depicted herein, may further include a predictive cooling configuration 40 (FIG. 7) and a predicative heating configuration 50 (FIG. 8). Referring to box 28 of FIGS. 7 and 8, environmental forecast source 226 provides environmental forecast information (e.g., temperature and/or humidity predictions for a specific location at specific times in the future) to computing device 220. According to one embodiment described herein, software 218 of computing device 220 may translate environmental information into data, referred to herein as predictive temperature information and/or predictive humidity information, utilizable by controller 200 in predicative cooling configuration 40 and predictive heating configuration 50. Computing device 220 then communicates the translated predictive temperature information and/or predictive humidity information to controller 200. According to another embodiment of control system 100, environmental information may be translated into predictive temperature information and/or predictive humidity information by machine readable media 206 of controller 200.

With reference to FIG. 7, predictive cooling configuration 40 of control system 100 is illustrated. As depicted in box 30, if controller 200 determines, at a point in time in the future equal to the present point in time plus the reaction time setting, the external air temperature is forecast to be less than or equal to the low temperature tolerance setting, then control system 100 repeats comparison of the temperature within confined space 110 (in box 16).

If however, controller 200 determines, as depicted in box 32 of FIG. 7, at a point in time in the future (less than the present point in time plus the forecast horizon setting) the external air temperature is forecast to be greater than the high temperature tolerance setting, and at a point in time in the future (less than the present point in time plus the reaction time) the external air temperature is forecast to be less than the high temperature tolerance setting but greater than or equal to the low temperature tolerance setting, then controller 200 compares the current external air temperature to the high temperature tolerance setting minus the differential setting (if utilized).

Referring next to box 34 of FIG. 7, if controller 200 determines (as a result of the comparison performed in box 32) the current external air temperature is less than the high temperature tolerance setting minus the differential setting (if utilized) and the external air humidity level is less than or equal to the predictive high humidity tolerance setting, and the controller 200 further determines the internal temperature is greater than the current external temperature, then controller 200 generates output commands (FIGS. 3 and 4) for operating external air intake 130. As depicted in box 38, external air intake 130 is operated until the temperature within confined space 110 equals the predictive low temperature tolerance, or the temperature within confined space 110 begins to increase, at which point controller 200 generates output commands to deactivate external air intake 130. Optionally, controller 200 may then generate output commands to operate cooling system 120 until the temperature within confined space 1.10 equals the desired temperature setting or the low temperature tolerance setting.

However, if as depicted in box 36 of FIG. 7 controller 200 determines (as a result of the comparison performed in box 32) the current external air temperature is greater than the high temperature tolerance setting, or the current external air humidity level is greater than the predictive high humidity limit, external air intake 130 will not be activated. Further, the comparison of the temperature within confined space 110 to the high temperature tolerance setting and the low temperature tolerance setting (performed in box 16) may then be repeated.

With reference to FIG. 8, predictive heating configuration 50 of control system 100 is illustrated. As depicted in box 30, if controller 200 determines, at a point in time in the future equal to the present point in time plus the reaction time setting, the external air temperature is forecast to be greater than or equal to the high temperature tolerance setting, then control system 100 repeats the comparison of the temperature within confined space 110 (in box 16).

If however, controller 200 determines, as depicted in box 32 of FIG. 8, at a point in time in the future (less than the present point in time plus the forecast horizon setting) the external air temperature is forecast to be less than the low temperature tolerance setting, and at a point in time in the future (less than the present point in time plus the reaction time) the external air temperature is forecast to be greater than the low temperature tolerance setting but less than the high temperature tolerance setting, then controller 200 compares the current external air temperature to the low temperature tolerance setting.

Referring next to boxes 34 of FIG. 8, if controller 200 determines (as a result of the comparison performed in box 32) the current external air temperature is greater than the low temperature tolerance setting and the current external air humidity level is greater than or equal to the predicative low humidity tolerance setting, and the internal air temperature is less than the current external air temperature, then controller 200 generates output commands (FIGS. 3 and 4) for operating external air intake 130. As depicted in box 38, external air intake 130 is operated until the temperature within confined space 110 equals the predictive high temperature tolerance setting or the temperature within confined space 110 begins to decrease, at which point controller 200 generates output commands to deactivate external air intake 130. Optionally, controller 200 may then generate output commands to operate heating system 125 until the temperature within confined space 110 equals the desired temperature setting or the high temperature tolerance setting.

If however, as depicted in box 36 of FIG. 8, controller 200 determines (as a result of the comparison performed in box 32) the current external air temperature is greater than the high temperature tolerance setting, or the current external air humidity level is greater than the predictive high humidity limit setting, then external air intake 130 will not be activated. Further, the comparison of the temperature within confined space 110 to the high temperature tolerance setting and the low temperature tolerance setting (performed in box 16) maybe repeated.

Control system 100 provides a system and method which utilizes external air for heating and cooling of confined space 110, thereby reducing the use of heating system 125 and cooling system 130 and reducing energy consumption and costs to the user. Also, control system 100 provides for a system and method which utilizes predictive heating configuration 50 and predictive cooling configuration 40 capable of utilizing external air to adjust current environmental factors within confined space 110 (within additional tolerance settings) based on forecast environmental information. Thus, predictive heating configuration 50 and predictive cooling configuration 40 further reduce the use of heating system 125 and cooling system 130 and further reduce energy consumption and costs to the user.

In another embodiment of the present disclosure, control system 100 provides an Away Mode of operation, wherein the temperature and humidity of space 110 is controlled according to the above-described operations, but using different settings and tolerances. Generally, when space 110 is not occupied (e.g., during vacations, facility shut-downs, etc.), it may be acceptable to permit the temperature within space 110 to be warmer and/or cooler than would otherwise be acceptable if space 110 were occupied. By permitting warmer and/or cooler temperatures within space 110, the Away Mode of operation results in even greater reductions in energy consumption and operation costs.

In one embodiment, a user may activate an Away Mode option using (as an input 202 to controller 200 or computing device 220) each time the user intends for space 110 to be unoccupied. In another embodiment, controller 200 is coupled to a security system (not shown), which is activated by a user when the user is leaving space 110. When activated, the security system may then provide a signal to controller 200 which controller 200 interprets as a command to enter the Away Mode of operation. As yet another alternative, the user may program one or more away time periods for the Away Mode of operation, each including a start and an end time and representing a time period during which the user knows that space 110 will be unoccupied.

The Away Mode of operation may include all of the features described above with reference to FIGS. 1-8. However, controller 200 reacts to activation of the Away Mode by utilizing a different set of temperature and humidity settings and tolerances, which may either be inputted by the user or automatically generated by controller 200 by applying one or more offsets to the standard temperature and humidity settings and tolerances. More specifically, the user may define a standard desired temperature setting of, for example, 70° F., with high and low temperature tolerance settings of, for example, 4° F. As described above, control system 100 will normally utilize heating system 125, cooling system 120, and/or external air intake 130 to maintain the temperature within space 110 to within +/−4° F. of 70° F. When in Away Mode, however, control system 100 may use a desired temperature setting of, for example, 75° F. (during a time the external temperature is likely to exceed 75° F.—i.e., during a warm season), and high and low temperature tolerance settings of, for example, 8° F. As indicated above, the Away Mode desired temperature setting of 75° F. may be inputted by the user or automatically calculated by controller 200 based on an offset (in this instance, 5° F.) which is preprogrammed or selected by the user. In this manner, when operated in the Away Mode, control system 100 will not generate commands to cause cooling of space 110 (which may include use of cooling system 120) until the temperature within space 110 exceeds 83° F., as compared to 74° F. of standard operation. The humidity settings and the predictive temperature and humidity settings may similarly be adjusted during the Away Mode of operation to result in less frequent use of heating system 125 and cooling system 120.

It should be understood that in an embodiment wherein an away time period is utilized by control system 100, controller 200 may readily be configured to employ reaction time logic to determine a time before the end time of the away time period to begin normal operation to ensure that the temperature of space 110 is controlled to the normal desired settings associated with standard operation. In this manner, control system 100 begins heating or cooling as appropriate before the away time period ends to provide a comfortable temperature of space 110 when people return to space 110.

In yet another embodiment of the present disclosure, controller 200 is configured to operate in a Peak Hours Mode. In some locations, electricity consumers may receive discounts from electricity providers for reduced energy consumption during peak consumption hours. The Peak Hours Mode is provided to take advantage of these potential discounts. In particular, controller 200 may use temperature and humidity settings and tolerances that differ from those used during standard operation when operating in Peak Hours Mode. The temperature and humidity settings and tolerance of Peak Flours Mode may be provided manually or computed automatically in manner described above with reference to the Away Mode of operation. Additionally, the peak hours schedule may be provided to controller 200 by the user (e.g., manually), or by a smart electric meter or a website coupled to controller 200 (e.g., via computing device 220). In this manner, control system 100 will automatically operate in Peak Hours Mode during the peak hours indicated by the peak hours schedule. As should be apparent from the foregoing, the temperature and humidity settings and tolerances of Peak Hours Mode result in warmer and/or cooler temperatures within space 110 than would be provided during standard operation to reduce the use of heating system 125 and cooling system 120, thereby reducing energy consumption.

It should be understood that when operating in Away Mode or Peak Hours Mode (each being an example of a Reduced Consumption Mode), control system 100 may be configured to utilize external air (if external air conditions permit) to achieve the temperature and humidity settings and tolerances associated with standard operation. In other words, although operating in Away Mode or Peak Hours Mode, control system 100 will nonetheless attempt to maintain the conditions within space 110 as associated with standard operation, but only to the extent such conditions can be maintained (or approached) using external air, which requires minimal energy consumption.

In another embodiment of the present disclosure, control system 100 is coupled to or includes an electricity meter that provides electricity consumption data to control system 100. In this manner, controller 200 may maintain a record in memory 204 of the actual energy consumption of control system 100 to provide, for example, a report to a user of the total carbon footprint associated with control system 100. By incorporating the peak hours schedule input described above, controller 200 may readily be configured to determine the carbon footprint of control system 100 during peak and non-peak hours. Controller 200 may also be configured to provide a report covering a user-selectable time period that indicates the total carbon footprint of control system 110 during peak and non-peak hours. This report may be periodically generated or generated on command by the user, and downloaded to computing device 220 or another device coupled via a network (e.g., the internet) to controller 200. Alternatively, the report may be obtained from controller 200 via a USB connection or other similar wired connection.

While this disclosure has been described as having exemplary designs, the present disclosure can be further modified within the spirit and scope of this disclosure. This application is therefore intended to cover any variations, uses or adaptations of the disclosure using its general principles. Further, this application is intended to cover such departures from the present disclosure as come within known or customary practice in the art to which this disclosure pertains and which fall within the limits of the appended claims.

What is claimed is:

1. A control system for governing temperature levels within a confined space having a heating system, a cooling system, and a thermostat controller operatively coupled to the heating system and the cooling system, the control system comprising:
   a first sensor adapted to detect internal temperatures within the confined space;
   a second sensor adapted to detect external temperatures external to the confined space;
   a controller coupled to the first and second sensors, and having an input adapted to receive a plurality of settings including a first high temperature tolerance setting and a first low temperature tolerance setting, the controller being adapted to compare the internal temperatures, the external temperatures, and the plurality of settings to a plurality of predefined rules for governing a generation of commands by the controller; and
   an external air intake operatively coupled to the controller and adapted to introduce air from outside the confined space into the confined space;
   wherein the controller generates commands for operating the external air intake to bring in external air if: (1) the internal temperature is greater than the first high temperature tolerance setting or lower than the first low temperature tolerance setting and (2) the external temperature is less than the first high temperature tolerance setting and greater than the first lower temperature tolerance setting.

2. The control system of claim 1, wherein the input is further adapted to receive a command to enter a Reduced Consumption Mode of operation during which the controller uses a second high temperature tolerance setting which is greater than the first high temperature tolerance setting and a second low temperature tolerance setting which is less than the first low temperature tolerance setting.

3. The control system of claim 2, wherein the command to enter the Reduced Consumption Mode is associated with an away time period, and the controller is configured to use the second high temperature tolerance setting and the second low temperature tolerance setting during a first portion of the away time period and the first high temperature tolerance setting and the first low temperature tolerance setting during a second portion of the away time period.

4. The control system of claim 2, wherein the command to enter the Reduced Consumption Mode is associated with a peak hours schedule provided by an electricity provider and corresponding to hours designated by the provider as hours of peak energy consumption.

5. The control system of claim 1, wherein the controller is configured to store electricity consumption data and compute a data total corresponding to the total energy consumption of the control system.

6. The control system of claim 1, wherein the input is further adapted to receive a command to enter one of a plurality of modes during which the controller uses one of a plurality of high temperature tolerance settings as a second high temperature tolerance setting and one of a plurality of low temperature tolerance settings as a second low temperature tolerance setting.

7. The control system of claim 1, wherein the control system further comprises:

a third sensor adapted to detect internal humidity within the confined space;

a fourth sensor adapted to detect external humidity external to the confined space;

the controller further coupled to the third and fourth sensors, and the input adapted to receive a plurality of settings including a first high humidity tolerance setting and a first low humidity tolerance setting, the controller being adapted to compare the internal humidity, the external humidity, and the plurality of settings to a plurality of predefined rules for governing the generation of commands by the controller;

wherein the input is further adapted to receive a command to enter one of a plurality of humidity modes during which the controller uses one of a plurality of high humidity tolerance settings as a second high humidity tolerance setting and one of a plurality of low humidity tolerance settings as a second low humidity tolerance setting.

8. The control system of claim 5, wherein the data total is a carbon footprint total.

9. The control system of claim 3, wherein the away time period is determined by time periods during which a user intends the confined space will be unoccupied.

10. The control system of claim 3, wherein the away time period is determined by a security system, whereby said security system is activated by a user when the user is leaving the confined space.

11. The control system of claim 3, wherein the away time period is determined by at least one user-selectable start time and at least one user-selectable end time.

12. The control system of claim 2, wherein the second high temperature tolerance setting and the second low temperature tolerance setting are input into the controller by a user.

13. The control system of claim 2, wherein the second high temperature tolerance setting and the second low temperature tolerance setting are calculated by the controller based on an offset selected from a group including preprogrammed offsets and offsets selected by a user.

14. The control system of claim 3, wherein the control system begins heating or cooling the confined space before the away time period ends to provide a target temperature of the confined space for a time in the future when the confined space will be occupied.

15. The control system of claim 4, wherein the peak hours schedule is input into the controller in one of manually input by a user, by a smart electric meter, and by a network coupled to the controller.

16. The control system of claim 2, wherein the control system is configured to utilize external air to achieve the first temperature tolerance settings and the first humidity tolerance settings, but only to the extent such conditions can be maintained using external air.

17. The control system of claim 5, wherein the control system includes an electricity meter that provides electricity consumption data to the control system, whereby the controller uses the data to produce a report of the data total associated with the control system during peak and non-peak hours.

18. The control system of claim 5, wherein the controller is configured to provide a report covering a user-selectable time period that indicates the data total of the control system during peak and non-peak hours.

19. The control system of claim 18, wherein the report is generated periodically and is downloaded to one of a computing device, a device coupled via a network to the controller, a USB connection, and another wired connection.

20. The control system of claim 18, wherein the report is generated on command by the user and is downloaded to one of a computing device, a device coupled via a network to the controller, a USB connection, and another wired connection.

* * * * *